United States Patent [19]

Hoffmeyer et al.

[11] 3,808,778

[45] May 7, 1974

[54] LAWN MOWERS ARTICULARLY SUPPORTED ON A TRACTOR

[75] Inventors: Knud H. Hoffmeyer, Racine; Donald G. Haffner, Greendale; Frank A. Ecker, Racine, all of Wis.

[73] Assignee: Jacobsen Manufacturing Company, Racine, Wis.

[22] Filed: Jan. 8, 1973

[21] Appl. No.: 321,681

[52] U.S. Cl. .................................. 56/7, 56/16.2
[51] Int. Cl. .......................................... A01d 75/30
[58] Field of Search ........... 56/6, 7, 13.6, 15.9, 16.2

[56] References Cited
UNITED STATES PATENTS

| | | | |
|---|---|---|---|
| 2,659,190 | 11/1953 | Imbt | 56/7 |
| 3,106,811 | 10/1963 | Heth et al. | 56/7 |
| 3,177,638 | 4/1965 | Johnson | 56/7 |
| 3,429,109 | 2/1969 | Heth et al. | 56/7 |
| 3,472,005 | 10/1969 | Profenna | 56/7 |
| 3,514,926 | 6/1970 | Heth et al. | 56/7 |

Primary Examiner—Russell R. Kinsey
Attorney, Agent, or Firm—Arthur J. Hansmann

[57] ABSTRACT

Lawn mowers articularly supported on a tractor, and there being nine mowers in all. Each of the mowers is connected to the tractor through a pivot joint which is under the influence of a hydraulic cylinder assembly for raising and lowering each mower for positioning the mowers for mowing and for transport. The hydraulic cylinder assemblies are connected with a pump and with hydraulic valves which control the action of the hydraulic cylinders. The two mowers which are laterally farthest from the tractor are supported on an arm which has two pivot joints under the influence of two cylinder assemblies. Hydraulic check valves are in the hydraulic circuit for sequencing the action of the two cylinder assemblies active on the arm, so that the mower on the outer end of the arm can be positioned in a compact transport position with the tractor. Also, lost motion mechanism is included in the support of the mowers so that they can assume the elevation of the ground being mowed.

16 Claims, 4 Drawing Figures

3,808,778

LAWN MOWERS ARTICULARLY SUPPORTED ON A TRACTOR

This invention relates to lawn mowers articularly mounted on a tractor, and, more particularly, it relates to a gang lawn mower which is shown to include nine mowers and which has special arrangements for positioning the mowers between transport position and ground mowing position.

BACKGROUND OF THE INVENTION

The prior art already includes disclosures of gang mowers where, for instance, seven mowers are included in the mowing machine, and the mowers can be controlled by being steered and also by being raised to transport positions on the supporting tractor. Examples of prior art gang mowers are shown in U.S. Pat. Nos. 3,429,109 and 3,472,005. Further, these prior art gang mowers are commonly arranged so that the mowers can be raised and lowered under the influence of hydraulic systems, including cylinder assemblies and valves which are under the control of the operator, such as shown in these two patents.

Additionally, the prior art also includes disclosures for positioning mowers in compact positions adjacent the supporting tractor when the mowers are in the transport position. Examples of these prior art structures are found in U.S. Pat. Nos. 2,104,719 and 3,177,638 and 3,248,864. In these prior art structures, the mowers are supported on the tractor through one or more supporting joints which permit the mower to be disposed in a compact position relative to the tractor.

However, the goal of the construction of a large gang mower is to include as many mowers as possible and yet have the mowers positioned in a compact arrangement with the tractor when the machine is in the transport position. There is a degree of physical limitation as to how many mowers can be incorporated in a mowing machine and yet have the mowers positioned compactly with the tractor when in the transport position. In the present invention, nine mowers are supported by the tractor, and all of these mowers can be raised to the transport position and be compactly disposed relative to the tractor. Accordingly, it is the primary object of this invention to provide the structure mentioned, namely, a gang mowing machine having a plurality of mowers wherein the mowers can be compactly positioned with the tractor in the transport position. In accomplishing this object, the mowers which are laterally farthest from the tractor are supported on an arm which includes two pivot joints having different axes so that the parts of the arm can move in different directions relative to each other and thus the mower supported on the arm can be positioned compactly with the tractor without being elevated too high or without being swung rearwardly or forwardly of the tractor in an awkward position.

Still further, it is an object of this invention to provide a gang mowing machine wherein the mowers are articularly supported on the tractor and can be folded or positioned into a transport position by accommodating the folding or positioning of adjacent mowers and making allowances therefor. In accomplishing this object, nine mowers can be included in the gang of mowers, and all of the nine mowers can be brought to a compact transport position relative to the tractor.

Still another object of this invention is to provide a gang mowing machine wherein a large plurality of mowers are included in the machine, and the laterally outer-most ones of the mowers are supported on the tractor by a lost-motion connection which permits the mowers to respond to the irregularities in ground elevation during mowing. This particular object is accomplished even though the mowers are articularly supported on the tractor and are under the influence of a hydraulic system which raises and lowers the mowers for positioning them between transport position and mowing position. Still another object of this invention is to provide a gang mowing machine which has a large plurality of mowers and wherein the mowers are under the influence of a hydraulic system, and the system includes means, such as check valves, which automatically insure that a sequential operation of the lifting action of the cylinder assembly will be accomplished, for positioning the mowers between the transport position and the ground engaging position.

Other objects and advantages will become apparent upon reading the following description in light of the accompanying drawings.

DETAILED DESCRIPTION OF THE PREFERRED EMBODIMENT

Figure 1:
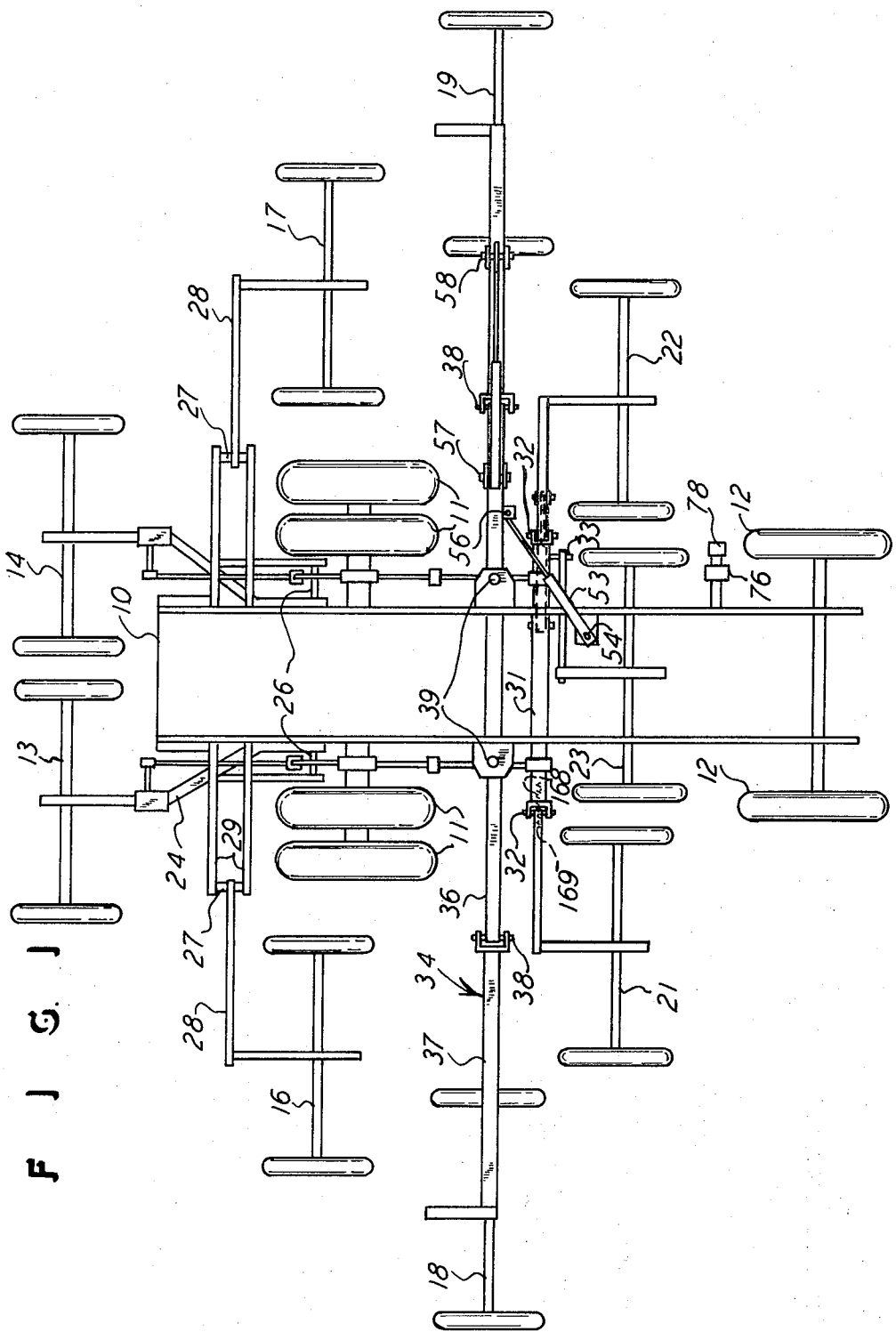
FIG. 1 is a top plan view of the mowing machine of this invention and showing the nine mowers in the gang.

FIG. 1 shows a tractor 10 having front wheels 11 and rear steerable wheels 12. The drawing further shows the nine mowers which are articularly supported on the tractor 10, and they include the two front mowers which are the left center mower 13 and the right center mower 14, and the left front outrigger mower 16 and the right front outrigger mower 17, and the left rear outrigger mower 18 and the right rear outrigger mower 19, and the left wing mower 21 and the right wing mower 22, and the center mower 23. All nine of these mowers are pivotally connected to the tractor 10 so that they can be positioned in the moving or lowered position, as shown in FIG. 1, and they can also be raised to the transport position where they are compact with and adjacent to the tractor 10.

The front mowers 13 and 14 are pivotally attached to the tractor 10 through push arm assemblies 24 mounted on pivot joints 26. The two outrigger mowers 16 and 17 are pivoted to the tractor 10 through pivot joints 27 which connect the laterally extending arm 28 to the mower arms 29 which are fixed on the tractor 10. The wing mowers 21 and 22 are connected to the tractor carriage member 31 through pivot joints 32. The center mower 23 is connected to the tractor 10 through the pivot joint 33 which is suitably supported on the tractor 10, and the mower 23 has its arm extending over to the joint 33, as shown. All of the aforementioned pivot joints have horizontally disposed axes of pivot. The rear outrigger mowers 18 and 19 are articularly supported on the tractor 10 through an arm generally designated 34 and having a laterally inner portion 36 and a laterally outer portion 37 which are joined together by a pivot joint 38 which has a horizontally disposed axis. Further, the arms 34 are pivotally supported on the tractor 10 through a pivot joint 39 which is shown to have a vertically disposed axis. Therefore, at this time it will be mentioned that the rear outrigger movers 18 and 19 are positioned into transport position by initially raising the mowers about the horizontal pivot axis of the pivot joints 38 and then subsequently swinging the entire arm 34 rearwardly of the fore-and-aft direction of the tractor 10 so that the arms 34 assume a position rearwardly and sidewardly, respectively, of the tractor 10. That is, the arm portions 36 are actually swung to a position vertically above the joints 32. This arrangement with the arm 34 and its two pivot joints 38 and 39 permits the rear outrigger mowers 18 and 19 to be compactly positioned adjacent the tractor 10 in the transport position, and it avoids either raising the mowers 18 and 19 to the full length of the arm 34 or to leave the arm 36 extended completely laterally of the tractor 10, both occurrences resulting in an undesirable positioning of the mowers 18 and 19 in the transport position.

Except for the rear outrigger mowers 18 and 19, the arrangement described thus far is at least similar to that shown in U.S. Pat. No. 3,429,109 and relative to the inner seven mowers shown in said patent and to the tractor shown therein.

Figure 2:
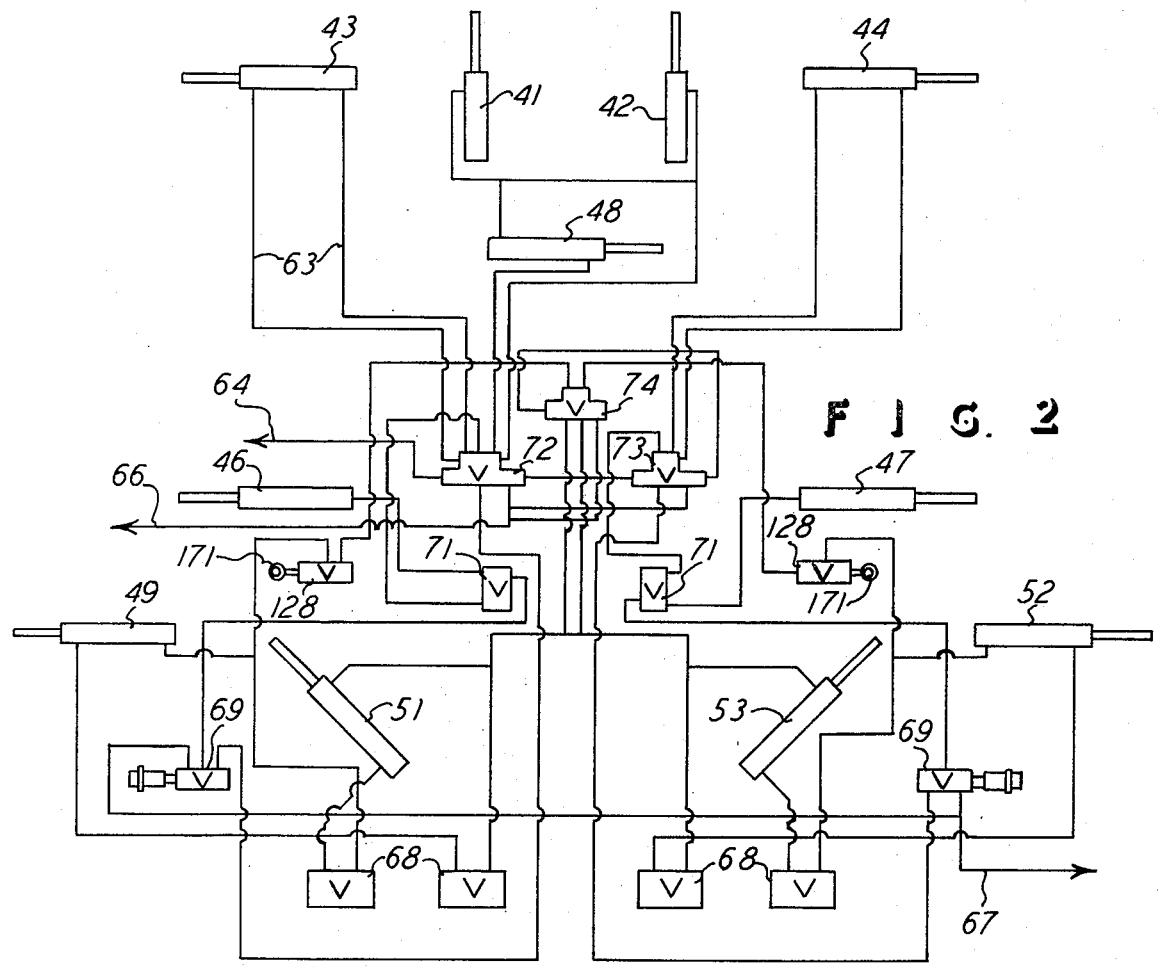
FIG. 2 is a diagramatic view of the hydraulic circuit employed in the machine shown in FIG. 1.

A hydraulic cylinder assembly is connected across to each of the pivot joints previously described herein. Thus FIG. 2 shows cylinder assemblies 41 and 42 which respectively control the action of the push arms 24 about pivot joints 26. Further, there are two cylinder assemblies 43 and 44 which control the action of the arms 28 about pivot joints 27, respectively. Still further, two cylinder assemblies 46 and 47 extend across and thus control the action of wing mowers 21, 22 about pivot joints 32, respectively. Still further, cylinder assembly 48 serves to control the disposition of center mower 23 about pivot joint 33. With this arrangement described thus far, the seven inwardly disposed mowers are under the influence of the hydraulic system and the particular cylinder assemblies disclosed.

The two arms 34 extending laterally on opposite sides of the tractor 10 are each under the influence of two cylinder assemblies designated 49 and 51, for the left-hand rear outrigger mower 18, and they are designated 52 and 53, for the right-hand rear outrigger mower 19. It will of course be seen and understood that the cylinder assemblies 49 and 52 serve to move arms 37 relative to arm portions 36 pivot joints 38 for vertically raising and lowering the respective arm portions 37, and the cylinder assemblies 51 and 52 extend across the vertically disposed pivot joints 39, for respectively horizontally swinging the arm portions 36.

Figure 3:
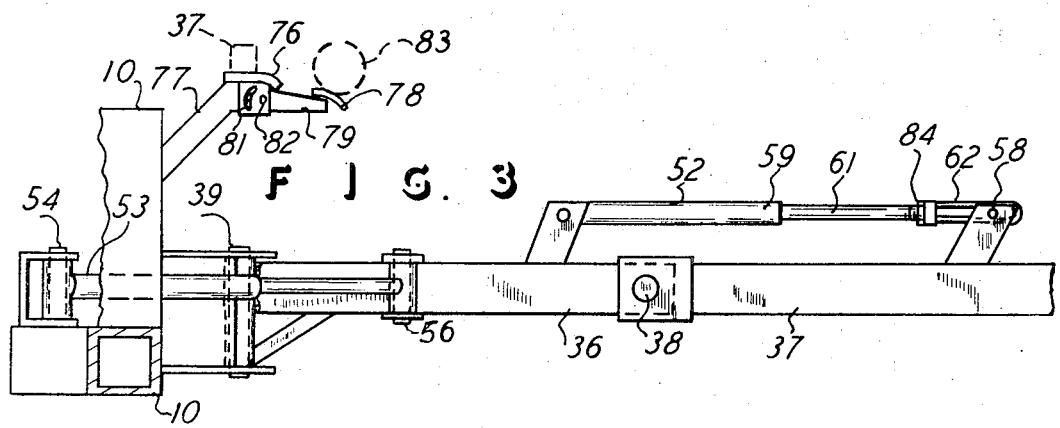
FIG. 3 is an enlarged rear elevational view of a fragment of the machine shown in FIG. 1.

FIGS. 1 and 2 show the cylinder assemblies connected with the two arms 34, and here it will be seen that the cylinder assemblies 49 and 52 extend directly laterally of the tractor 10 while the cylinder assemblies 51 and 53 extend diagonally laterally of the tractor 10 and are mounted on pivot mountings, such as the mounting 54 shown in FIG. 1, and the extending ends of the assemblies 51 and 53 pivotally connect to the respective arms 34 by the pivot pins, such as the shown pin 56 in FIG. 1. Also, the cylinder assemblies 49 and 52 pivotally connect at their opposite ends through pins, such as pins 57 and 58, to the arm portions 36 and 37, respectively, as seen in FIG. 1. FIG. 3 further shows the cylinder assemblies 52 and 53, and here it will be seen that the assemblies are suitably pinned to the respective portions 36 and 37 of the arm 34, with regard to cylinder assembly 52, and the cylinder assembly 53 is shown to be suitably pinned to the tractor 10 and to the arm portion 36, through the respective pins 54 and 56. Still further, each cylinder assembly is shown to have a cylinder element and an extendable and retractable rod, such as the cylinder element 59 and rod 61 shown in FIG. 3 in connection with cylinder assembly 52. FIG. 3 further shows that the extending end of rod 61 has a lost-motion type of connection with the pin 58 fixed on the arm portion 37, and this connection is in the form of a loop or clevis 62 which slidably receives the pin 58 in limit positions at the opposite ends of the looped piece 62. With this arrangement of the lost motion connection described, the rear outrigger mowers 18 and 19 can float or adjust to the variation in ground elevation during mowing, but the two mowers and their respective arms 37 are still under the influence of raising and lowering through the respective cylinder assemblies 49 and 52, and of course both the cylinder assemblies have the lost motion connection described. Of course the pivot joints 39 are fixed with the tractor 10 to retain their vertical axes as shown in FIGS. 1 and 3, and the cylinder assembly mounting pin 54 is of course also fixed with the tractor 10.

With the arrangement described thus far, it should be understood that when the rear outrigger mowers 18 and 19 are to be placed into the transport position, then the cylinder assembly 52 is initially actuated to vertically raise the arm portion 37, and subsequently the cylinder assembly 53 is actuated to swing the arm portion 36 rearwardly so that the mowers 18 and 19 will be positioned immediately adjacent the tractor 10 in a compact position. Further, if it is desired to raise the wing mowers 21 and 22, then the rear outrigger mowers 18 and 19 would have been raised first, as described, and then the wing mowers 21 and 22 could be raised even though the arm portions 36 extend above the connection and mounting for the wing mowers 21 and 22. However, the hydraulic system is arranged so that the sequence of the raising action would be that the cylinders would be actuated in sequence of first the cylinder 52, then the cylinder 53, and then the cylinder 47, relative to the right side of the machine, and it would be the same for the relationship on the left side of the machine and its respective assemblies.

FIG. 2 shows the hydraulic system wherein the hydraulic conduits or lines 63 are generally shown, and the various hydraulic valves designated "V" are also shown. Further, the hydraulic line 64 leads to the hydraulic pump, and the hydraulic lines 66 and 67 lead to the hydraulic reservoir.

In further description of the hydraulic system seen in FIG. 2, it will be mentioned that there are four sequence valves designated 68, and these valves have check valves within. FIG. 2 further shows two rear outrigger sensor valves 69, and it shows two wing unit lock-out valves 71. Still further, FIG. 2 shows three spool type of directional control valves 72, 73, and 74. The schematic drawing of FIG. 2 further shows the connections of the fluid lines generally designated 63. The latter mentioned valves are under the control of the operator of the mowing machine, so that he can set the valves and control the cylinder assemblies, as in U.S. Pat. No. 3,429,109, with regard to the seven mowers, excluding the rear outrigger mowers 18 and 19.

FIGS. 1 and 3 further show that there is a rest support 76 affixed to the side of the tractor 10 on an arm 77 for slidably receiving the portion 37 of the arm 34 when the latter is in the transport position. Also, a mower wheel rest pad 78 is on an adjustable arm 79 which swings up and down through an adjustment slot 81 and a pin connection 82, so that the adjustable arm 79 is supported on the mower arm 77 to present the wheel pad 78 for supporting the mower wheel as shown at 83. With the pads 76 and 78, the rear outrigger arm and mower are held in a firm position and will not move in the transport mode of the machine. Of course the both sides of the tractor 10 have the arrangement with the pads 76 and 78 for their respective arms 34 and mowers 18 and 19. To assure that the arms 34 will swing to rest upon the respective pads 76, an adjusting nut 84 is positioned between the cylinder rod 61 and the clevis 58 so that the cylinder assembly 52 will raise the arm portion 37 to the suitable height. The adjustment at 81 for the wheel mower pad 78 accommodates the different sizes of mower wheels which may be used, and it also assures that the mower will be in a firm transport position so that the mower and the arm 37 cannot swing during transport.

The hydraulic system is arranged so that there is a safety interlock to prevent the operator from employing an improper sequence when raising or lowering the wing mowers 21 and 22 and the rear outrigger mowers 18 and 19. With the interlock system to be described, if an attempt is made to lower the rear outrigger mowers 18 and 19 while the wing mowers 21 and 22 are up, the actuation of the valve handle will not produce any movement of these units. Once the wing units 21 and 22 have been lowered to an angle of 20° or less with respect to the horizontal, the rear outrigger mowers 18 and 19 can be lowered. If for any reason a wing mower 21 or 22 is at a position greater than the 20° angle, the outrigger mowers 18 and 19 on that side will not raise until the appropriate wing mower 21 or 22 has been positioned to less than 20°. Also, when raising the wing mowers 21 and 22, the rear outrigger mowers 18 and 19 must be folded tightly against the support pads 76 before the wing mowers 21 and 22 can be raised.

Figure 4:
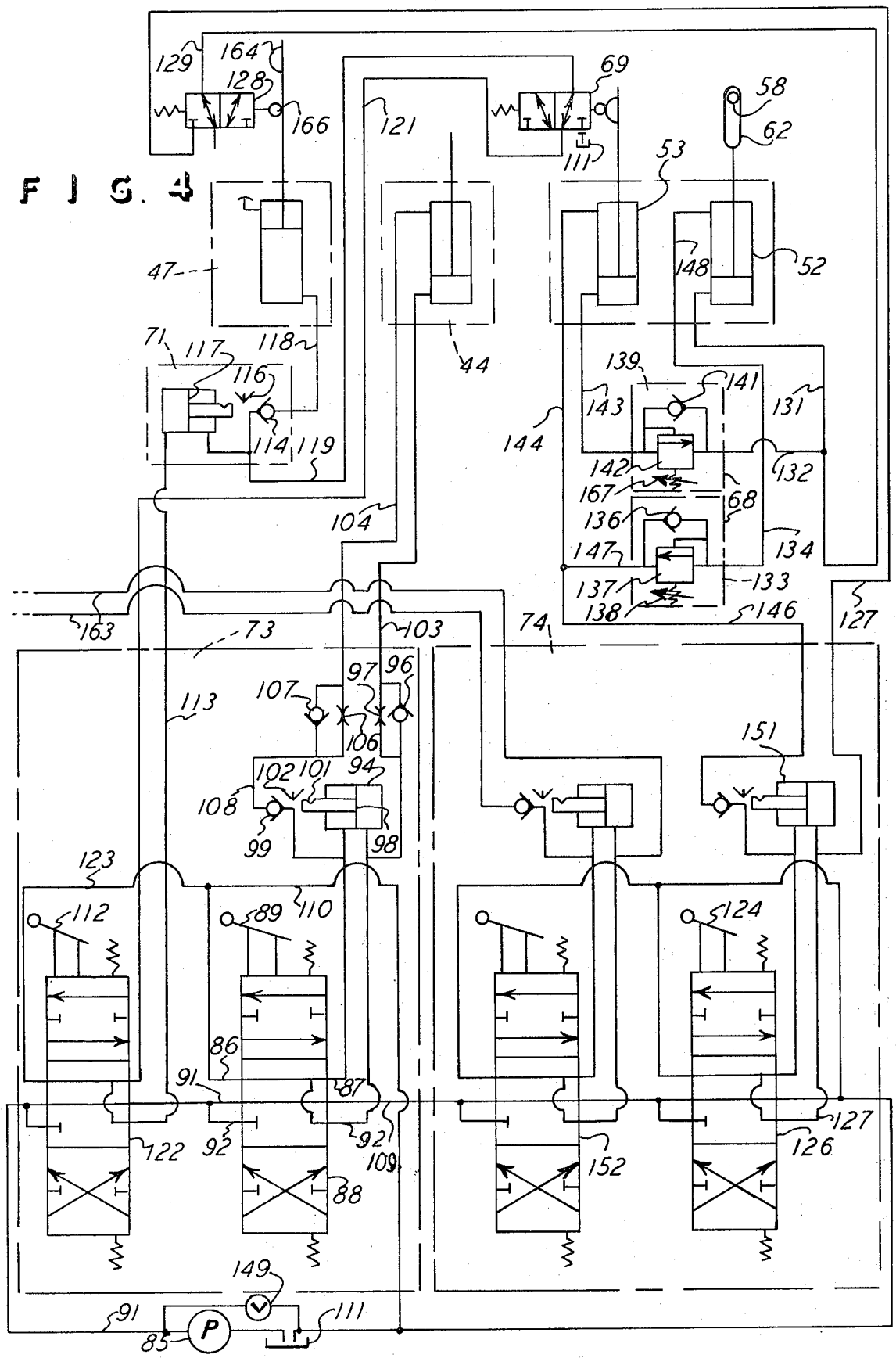
FIG. 4 is a schematic view of a portion of the hydraulic system used in the machine shown in FIG. 1.

FIG. 4 shows a portion of the hydraulic system, and the unshown portion is similar to that shown, and the entire system will be understood by one skilled in the art making reference to the drawings and descriptions herein. Spool valves 73 and 74 are shown in FIG. 4 in the dot-dash outlines therein and in the schematic showing within the dot-dash outlines. The valves are of the open center type such that when the spools are centered hydraulic fluid can flow from line 86 to line 87 as shown on one typical spool identified as 88. FIG. 4 shows the hydraulic system when the machine is in the transport mode, so that when the valve handle 89 is depressed to lower the mowers, the valve spool is shifted and the lines 86 and 87 are blocked, and fluid pressure from the pump 85 is transmitted through the line 91 and to the line 92 which is now in flow communication with the valve outlet line 93. Line 93 extends to a poppet check valve 94 and to a check valve 96 and a line restriction 97. The elements 96 and 97 create a back pressure in the line 93, and this causes the shift of a spool 98 to the left and that raises a poppet valve 99 off its seat, and a detent 101 receives a finger 102 to hold the poppet 99 in the open position. The handle 89 can then be released and the finger 102 will keep the poppet 99 open and allow restricted flow through the restriction 97 and to the line 103 and the cylinder assembly 44. Return flow is through line 104 and through restricted opening 106, rather than through the closed check valve 107, and flow goes through the line 108 and the poppet 99 and the line 87, to go through the spool 88 and to the line 86.

To raise the mowers from the mowing position, the valve handle 89 is lifted up, and the spool 88 is positioned so that the lines 91 and 109 are blocked, but line 87 is open to line 92 to bring the flow to the left side of the poppet 98 and then through the poppet valve 99, check valve 107, restriction 106, and back into the line 104 and to the cylinder assembly 44. Fluid pressure increases due to the load on the cylinder assembly 44, and this pressure is effective at the line 87 and it shifts the spool 98 out of its holding finger 102 and allows the poppet valve 99 to seat momentarily until fluid pressure builds up in the cylinder assembly and overcomes the load on the cylinder assembly and raises the mower. Then fluid flow through the poppet valve 99 keeps the poppet off its seat, and it will be understood that the poppet is biased closed by a light spring, in a conventional valving arrangement. Fluid flow is then through the check valve 107 and into the line 104 for negotiating the load on the cylinder assembly 44. Of course return flow is then in line 103 and through the check valve 96, and into the line 93 which connects with the line 86, in this setting of the spool 88 and directs the flow to the line 110 and the reservoir indicated 111. Releasing the valve handle 89 stops the flow and the poppet valve 99 is held on its seat by the pressure generated by the load acting on the cylinder assembly 44.

FIG. 2 further shows that valve 72 controls cylinder assemblies other than the assembly 44, and it would do so in a manner similar to that described in connection with valve 73 as shown in FIG. 4.

The following description will be the construction and function of supporting and lowering the right-hand wing unit 22 and the right-hand rear outrigger unit 19, and the lowering is in that sequence, and the raising of these units is in the reverse sequence. To lower, the spool of valve 73 is depressed through its handle 112, and is then released. Fluid flows through the line 113 to the pilot operated check valve 71. This fluid pressure causes the spool in valve 71 to shift and hold the check valve 114 off its seat by means of the finger 116 as the spool 117 is shifted. Since cylinder assembly 47 operating rear wing unit 22 is in the nature of a ram and is seen to be mounted underneath the pivot joint 32 in FIG. 1, opening the fluid line 118 to the assembly 47 permits the wing unit to drop under its own weight and the cylinder assembly 47 actually contracts to force fluid out of the cylinder and through the line 118 and through the check valve 71 and into the fluid line 119. The right-hand outrigger unit 19 is controlled by the sensor valve 69 which is connected to the line 119, and valve 69 is in position to communicate with outlet line 121, and the flow then continues back to the spool 122 of the valve 73, and thence to the line 123 and to the reservoir 111.

Continuing the sequence for lowering units 22 and 19, next the valve 74 is operated by depressing and holding the handle 124 controlling the spool 126 to cause fluid to flow out the line 127 and to the wing unit sensor valve 128. Valve 128 is now in position so that flow continues to the line 129 where the flow splits and follows the line 131 and the line 132. Since valve 68 in its check valve portion 133 is closed, and fluid pressure is transmitted to check valve 133 by the pressure in cylinder assembly 52 and through the line 134. Check valve 136 is held on its seat, and poppet check valve 137 is also held on its seat by an adjustable spring 138 which is set at a pressure above the pressure required to swing the rear outrigger mower when the entire machine is on an incline of 15° or less.

Referring to the other check valve portion 139 of the valve 68, the flow is in line 132 and can pass through the check valve 141 and poppet 142 to the line 143 and the cylinder assembly 53 which is then free to extend except for the force required to swing out the rear outrigger unit. Fluid flows out of the assembly 53 through the line 144 and the line 146 and back to valve 74. Line 147 is blocked, and the cylinder assembly 53 reaches the end of its stroke and pressure builds up in lines 143, 132 and 131. Fluid pressure is then transmitted across the piston of cylinder assembly 52 and to line 148 and to valve 133. When the set pressure of poppet valve 137 is reached, the poppet valve 137 opens and cylinder assembly 52 extends to the end of its stroke to lower the rear outrigger mower 19. The entire hydraulic system is then under a pressure which is relieved by the relief valve 149, and finally the handle 124 is released. In this action, the valve 74 has a check valve 151 which is similar to and operates like the valve 94 which was described in connection with the spool 88.

Also, it will be seen that FIG. 4 shows another spool 152 which serves lines 163 leading to the left-hand outrigger mower 18 lifting and rotating cylinders 49 and 51, and the arrangement and operation is the same as that described in connection with the right-hand units. Also, valve 72 and its arrangements would be similar to the showings in connection with valve 73 in FIG. 4.

Flotation of the wing units 46 and 47 during mowing is achieved by the valve 7 remaining in the open position as the finger 116 is in the valve detent and the cylinders 47 can extend and contract, but of course the cylinder assemblies 47 would be in the set position when the wing units are raised.

Improper sequence of lowering the units is impossible, since the valve 128 must be in its proper set position, by virtue of the position of the cylinder assembly 47 relative to the valve 128 and having the nature of a cam 164 operative on cam follower 166 of valve 128. Thus, if handle 124 were depressed to create pressure in line 127 to valve 128, valve 128 would block flow to line 129 and preclude lowering of the rear outrigger unit 19 until the wing unit 22 had been lowered. In this regard, there is the interlock or safety element of the hydraulic system.

Next, describing the structure and function for raising the units from the mowing position the valve handle 124 is lifted and held up so that fluid flow is out the line 146 and splits to lines 144 and 147, and flow continues through the check valve 133 to the line 134 and to the rod end of the rear outrigger cylinder assembly 52. The head of the cylinder assembly 52 is open to the reservoir 111 through the lines 131 and 129 and valve 128 which is open due to the down position of the wing unit 22 and its hydraulic system, and flow continues through the line 127 to the valve 74 and the reservoir 111. Flow was also through the line 144 to the rod end of cylinder assembly 53, and pressure is then in the line 143 and is checked by the check valve unit 139. The setting of the poppet 142 is such that it will not open until the rear outrigger unit is raised fully by the collapsing of the assembly 52 which pivoted the arm assembly 37 upwardly. When cylinder 52 is fully collapsed and the outrigger unit 19 is raised, fluid pressure builds up in line 148 and its continuation line at 134 and in the check valve 133 and into the line 147 and the line 144 to the rod end of the cylinder assembly 53. Pressure then continues in the line 143, to the extent permitted by setting of the adjustment 167 on the poppet 142, until valve 139 opens, and this setting is sufficient to have a pressure which allows for lifting of the outrigger unit and also for swinging the outrigger unit when the entire machine is in a declining attitude of 15° with the horizontal. The cylinder assembly 53 collapses to the end of its stroke, and the arm 37 folds back into the transport position to where it rests on the pad 76.

Finally, to further describe the construction and its function, if the operator were to attempt an improper sequence of raising the units, it would be assumed that the handle 112 would be lifted and fluid would flow out the line 121. However, since valve 69 would be in a position comparable to the rear outrigger unit 19 being down, flow would be through the valve 69 and to the reservoir designated 111 at valve 69, so the wing unit 22 would not be raised and could not be raised until the rear outrigger unit 19 is raised.

It is submitted that one skilled in the art will understand the mechanical and hydraulic structure of this mowing machine, and the drawings physically and diagramatically indicate the structure and the disclosure is of the structure and function so that one skilled in the art can understand both aspects. The arrangement is such that the arm 34 supporting the outrigger units is a double-jointed arm and it is folded to a position vertically above the respective wing unit 21 and 22. Further, the hydraulic system provides a powered mechanism for effecting the raising and lowering of the units, and the system has the interlock so that the proper sequence of raising and lowering will be followed, as described. In this regard, the valves are suitable interrelated so that 68, 69 and 128 are sequenced for permitting fluid flow, as described. Thus, there is the sequencing valve 128 which controls the fluid flow to the wing unit 22 and the outrigger unit 19 in proper sequence, and there is the sequence valve 68 which controls the flow to the cylinder assemblies 52 and 53, in their proper sequence for raising and for lowering the outrigger unit 19. FIG. 4 shows the mechanical relationship of the so-called cam 164 and cam follower 166 on cylinder assembly 47 and valve 128, in a schematic or diagramatic display. FIG. 1 shows a tension spring 168 which would be underneath each wing unit arm and attached at 169 to the arm, at one end of the spring 168, and attached to an eyelet 171 which is on the valve 128 and which is one practical way of mechanically interconnecting the movement of the wing unit with the element 166 of the valve 128. That is, when the wing unit 21 or 22 is raised, it will create a tension in its spring 168, and such spring may have a 10 pound pre-load so that it will not extend until beyond that tension, and the spring 168 will then pull on its respective eyelet connector 178 on the valve 128 to shift the valve 128 and thereby permit fluid pressure to continue to the cylinder assemblies 52 and 53 for the outrigger units, all as described and as apparent in the drawings. Further, it will be seen that the spool valves described are spring loaded and thus returned to their center position when their handles are released. Also, the valves 69 may actually be actuated by having their ends 172 movable into the valves by being in contact with the arm portions 36, when the latter are swung, to thereby set the valves 69 in the manner displayed by the cam 164 and follower 166. The ends are thus in line with the arms 36 to be pushed thereby, since the valves 69 are mounted in positions to be contacted by the arms 36.

What is claimed is:

1. A plurality of lawn mowers articularly supported on a tractor, comprising a tractor, a plurality of lawn mowers; pivot means including joints which separately and independently mount said mowers on said tractor so as to be disposed in a variety of desired positions; some of said pivot joints having horizontal axes for pivotal movement of said mowers in respective vertical planes, a mower support arm extending laterally on each side of said tractor, one of said mowers on the extending end of each of said arms, two of said pivot joints being disposed spaced apart on each of said arms for articularly connecting said arm to said tractor, the laterally outer one of said two pivot joints being included in said some of said pivot joints, the laterally inner one of said two pivot joints having an axis perpendicular to said horizontal axes for pivotal movement of said arm in a plane perpendicular to the vertical direction, and a mechanical means operatively connected across each of said pivot joints on each said arm for actuating each of said pivot joints to move said mower on said arm between a lowered ground-engaging mowing position and a raised transport position adjacent said tractor.

2. The subject matter as claimed in claim 1, wherein said mechanical means includes powered mechanisms having an automated sequential control for initially actuating said laterally outer pivot joint, to raise said one mower, and to subsequently actuate said laterally inner pivot joint.

3. The subject matter as claimed in claim 2, wherein each said powered mechanism consists of a fluid-powered cylinder assembly, and said automated sequential control includes a fluid valve operatively connected to each said cylinder assembly and having fluid-flow controls for automatically sequencing the actuation of said cylinder assemblies connected to each said arm.

4. The subject matter as claimed in claim 3, wherein said fluid flow controls include fluid check valve means operatively connected between the two of said cylinder assemblies, which are connected across said pivot joints on said arm, for sequencing operation of said two cylinder assemblies.

5. The subject matter as claimed in claim 2, wherein said plurality of lawn mowers is nine in number, and said arm extends from the fore-and-aft intermediate portion of said tractor to be centrally positioned on said tractor, and said arm extending for a length sufficient to position said two mowers farthest from said tractor when said nine mowers are in their mowing positions.

6. The subject matter as claimed in claim 5, wherein said perpendicular axis is vertically disposed at the laterally inner end of said arm, two of said nine mowers being disposed adjacent a respective one of said arms, and said automated sequential control is operatively connected with said powered mechanism across said pivot joints which mount the said two adjacent mowers on said tractor, for initially actuating both said pivot joints on said arm to raise said arm prior to actuating said pivot joints for raising said two adjacent mowers.

7. The subject matter as claimed in claim 1, wherein said plurality of lawn mowers is nine in number, and said arm extends from the fore-and-aft intermediate portion of said tractor to be centrally positioned on said tractor, and said arm extending for a length sufficient to position said two mowers farthest from said tractor when said nine mowers are in the mowing positions.

8. The subject matter as claimed in claim 1, including lost motion means interconnected between said tractor and some of said mowers for up and down movement of said some mowers in response to ground elevation irregularities.

9. The subject matter as claimed in claim 1, wherein said mechanical means includes hydraulic cylinder assemblies, and including a hydraulic pump and hydraulic valves operatively connected with said assemblies for powering said assemblies to actuate said pivot joints to thereby raise and lower said mowers.

10. The subject matter as claimed in claim 9, wherein said hydraulic valves include check valve means operatively connected between the two of said cylinder assemblies, which are connected across said pivot joints on said arm, for sequencing operation of said two cylinder assemblies.

11. The subject matter as claimed in claim 9, including an additional hydraulic check valve operatively connected with one of said assemblies and having means for releasably holding itself open to fluid flow therethrough for resistance-free action of said one assembly to thereby have the one of said pivot joints controlled by said one assembly free to articulate and permit its one of said mowers to raise and lower in response to irregularities in ground elevation.

12. The subject matter as claimed in claim 10, wherein said hydraulic valves include additional fluid check valve means operatively connected between those of said cylinder assemblies for said mowers adjacent those on said arm and the said two cylinder assemblies on said arm, for sequentially raising and lowering said adjacent mowers relative to said mowers on said arm.

13. The subject matter as claimed in claim 1, including a rest pad on said tractor at a location within the radius of the swing of said arm between its said two pivot joints, for supporting the radially inner end of said arm in the transport position.

14. The subject matter as claimed in claim 1, including a rest pad on said tractor at a location with the radius of the movement of said mower which is on said arm and when said mower is moved to transport position, for supporting the latter said mower in the transport position.

15. The subject matter as claimed in claim 14, wherein said rest pad for said mower is adjustably mounted on said tractor for aligning with said mower to engage the latter when said arm is swung to its transport position.

16. The subject matter as claimed in claim 13, including an additional rest pad on said tractor at a location with the radius of the movement of said mower which is on said arm, and when said mower is moved to transport position, for supporting the latter said mower in the transport position.

* * * * *